United States Patent [19]
Mocci

[11] Patent Number: 6,102,637
[45] Date of Patent: Aug. 15, 2000

[54] FLATBED WINCH WINDING BAR

[76] Inventor: Joseph Mocci, 2 Marc Dr., Matawan, N.J. 07747

[21] Appl. No.: 08/931,679

[22] Filed: Sep. 16, 1997

[51] Int. Cl.[7] ........................................ B60P 7/08
[52] U.S. Cl. .......................... 410/103; 410/96; 410/100; 410/156; 16/114 R; 74/544; 81/73
[58] Field of Search ................... 410/12, 96, 97, 410/100, 103, 156; 254/DIG. 3; 16/114 R; 7/168; 74/544, 545, 548; 81/177.2, 177.7, 489, 73, 35

[56] References Cited

U.S. PATENT DOCUMENTS

| | | | |
|---|---|---|---|
| 1,500,069 | 7/1924 | Gould | 81/35 |
| 2,302,954 | 11/1942 | Priest et al. | |
| 3,517,575 | 6/1970 | Roberson . | |
| 5,234,298 | 8/1993 | Shuker | 410/100 X |
| 5,301,389 | 4/1994 | Engel et al. | 16/114 R |
| 5,429,463 | 7/1995 | Howell | 410/156 |
| 5,433,565 | 7/1995 | Chan | 410/103 |
| 5,549,429 | 8/1996 | Sergent | 410/96 |
| 5,791,844 | 11/1998 | Anderson | 410/103 |
| 5,833,217 | 11/1998 | Goldsby | 74/545 X |

FOREIGN PATENT DOCUMENTS 794100  4/1958  United Kingdom .

*Primary Examiner*—Stephen T. Gordon
*Attorney, Agent, or Firm*—Mandel & Peslak, LLC; Arthur M. Peslak, Esq.

[57] ABSTRACT

A winding tool for a winch is disclosed. The winch is used on flatbed trailers to hold webbing used to strap down loads on the trailer. The winding tool is designed to use the winch bar interface on currently available winches.

10 Claims, 2 Drawing Sheets

FLATBED WINCH WINDING BAR

The present invention relates to a device which facilitates the quick and efficient winding of tie-down webbing onto flatbed trailer winches. No device is currently available or in use that performs this type of winding operation. Features which distinguish the present invention from other methods of web retrieval are the speed of web recovery, the minimal cost of the device, the ease of storage on board either the flatbed trailer or truck cab, and convenience of replacing the common method of hand winding by mechanical means.

BACKGROUND OF THE INVENTION

The majority of goods moved through commerce today are transported by motor freight. One means of motor freight is the flatbed trailer. Once the goods are loaded onto the flatbed trailer, the goods must be secured from shifting to avoid damage to the goods, trailer, other vehicles and passing motorists.

The typical method employed on flatbed trailers to secure freight is the webbing winch such as illustrated in U.S. Pat. No. 4,055,002. The typical webbing winch uses a dacron web to strap cargo down against the deck of the flatbed trailer. The web is first placed over the cargo on the trailer. Any slackness in the web is tightened by incrementally rotating the winch so that the web is taken up on the winch drum. To gain the leverage needed to achieve the required tension to secure the freight, a winch bar is inserted into the winch to gain the leverage needed to tension the web. A typical winch bar is illustrated in U.S. Pat. No. 5,433,565. A ratchet device in the winch prevents the winch from unwinding under the load.

Once the freight is removed from the trailer, the webbing must be reeled back onto the winch drum for safe storage. Since the winch bar has a limited range of travel, using the winch bar to reel up the slack webbing is very time consuming. Most flatbed trailer operators prefer to perform this task by rotating the winch drum by hand.

Hand winding creates a number of inconveniences for the trailer operator. First is that the winch is typically full of road dirt and grime which is transferred to the operators gloves, hands and clothing during the winding operation. Secondly, although hand winding is faster than using the winch bar, it is still a time consuming process, especially since multiple winches are used on a flatbed trailer when securing a load. Additionally, the friction within the winch and the drag of the webbing makes it difficult to wind the webbing onto the winch drum by hand. Finally, given the location of the winch on the underside of the trailer bed, there are many obstructions which can cause injury to the operator's hand when winding the winch by hand.

The present invention addresses and resolves these drawbacks associated with winch bar and hand winding webbing onto the winch. The present invention allows the operator to wind the webbing in a fraction of the time required by either method while providing the torque necessary to overcome any friction and other winding resistance while providing enough tension to secure the webbing while not in use.

SUMMARY OF THE INVENTION

The present invention is directed to providing a means for reeling up the slack webbing on flatbed trailer winches while eliminating the impracticalities of the currently employed methods of winch bar and hand winding. A unique combination of features allows the present invention to perform the task of winding the winch webbing in a fashion, speed and convenience never before enjoyed by any other device used for this task.

The first feature is the ease of engagement of the winding bar to the winch. Using the existing winch holes designed to accept the winch bar, the winding bar employees a simple hook configuration to provide a positive engagement to the winch drum.

The second feature is the rolling sleeves over the winch bar's main element. The sleeves allow the bar to be rotated quickly, minimizing friction while providing a means of securely grasping and controlling the winding bar.

The third feature is the simple design which facilitates cost effective manufacture. The design also lends itself to be easily stored in either the truck cab or on the trailer itself without any dedicated storage compartment or apparatus.

Lastly, the design performs a function longly desired by flatbed operators by enabling the retrieval of the winch webbing in a fraction of the time required by methods currently available or employed.

The function of the present invention is accomplished through the use of a steel rod that passes through two steel sleeves. The rod is bent in a fashion that enables the user to rotate the rod using simple hand motion while grasping the steel sleeves. The far end of the rod contains a hook which provides the interface to the winch and transfers the rotary motion from the winding bar to the web winch.

DETAILED DESCRIPTION OF THE INVENTION

Figure 1:
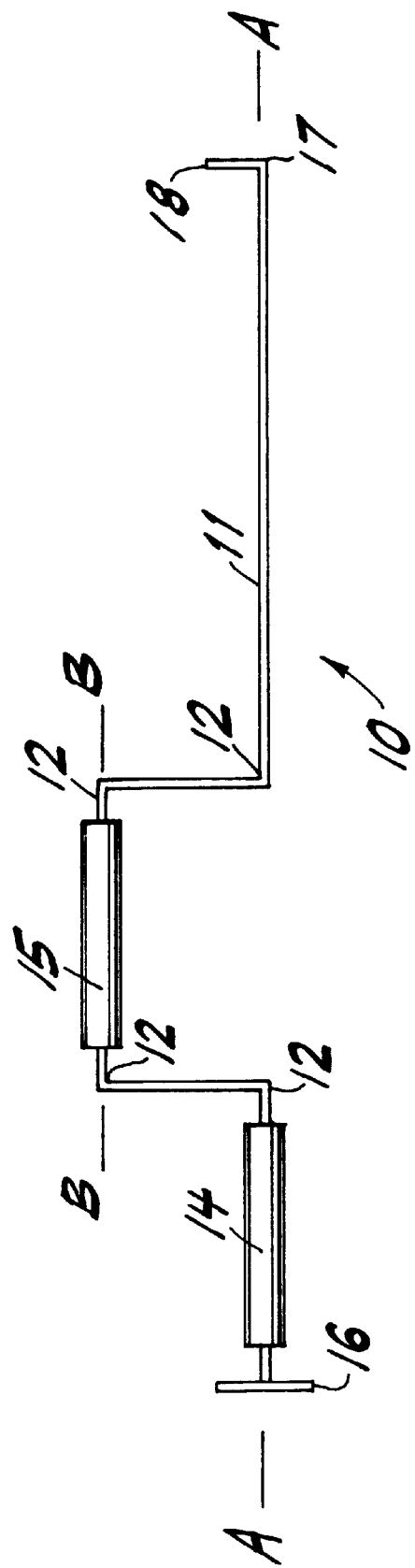
FIG. 1 is a plan view of a winding bar of the present invention.

The winch winding bar of the present invention 10 is illustrated in FIG. 1. The winch winding bar 10 is composed of a steel rod 11 of the general configuration shown in FIG. 1. The winding bar 10 further comprises two sleeves 14 and 15. The sleeves 14 and 15 are axially elongated with a hollow center. The sleeves 14 and 15 are mounted over the steel rod 11 in the positions shown in FIG. 1. At one end of the steel rod 11 a knob 16 is rotatingly mounted. The knob 16 will prevent the adjacent sleeve 14 from sliding off of the winding bar 10. In addition, the knob 16 will also rotate on the axis A—A of winding bar 10 to facilitate the winding process. The second sleeve 15 is mounted in position by four approximately 90° bends 12 which fix the sleeve 15 in the portion of steel bar 11 with axis B—B. As shown in FIG. 1, axis B—B is parallel to but offset from axis A—A.

At the end opposite of the knob 16, the steel rod 11 comprises an approximately 90° bend at point 17. Thus, a hook 18 is formed at that end of the steel rod 11. Hook 18 is adapted to be received in the winch 20.

Figure 2:
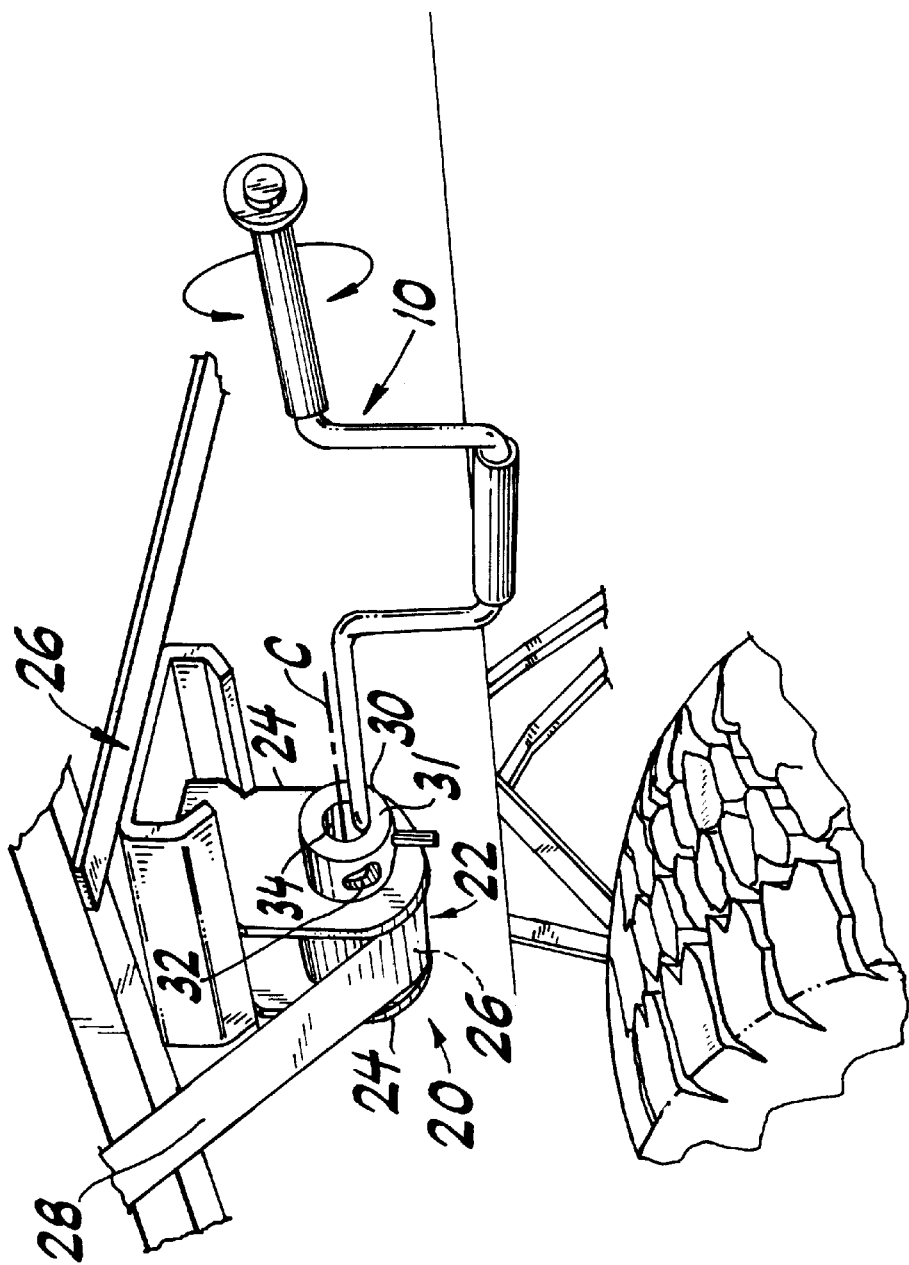
FIG. 2 is a plan view of the winding bar of the present invention in conjunction with a winch.

As shown in FIG. 2, the winch 20 comprises a rotating cylinder 22 mounted between two posts 24. The rotating cylinder 22 comprises a central portion 26 on which the webbing 28 is wound. On one end, the rotating cylinder 22 comprises a winch bar interface 30. The winch bar interface 30 comprises an annular wall 31, a plurality of apertures 32 in the annular wall 31 perpendicular to axis C—C of the rotating cylinder 22, and an aperture 34 on the end of the winch bar interface in a plane perpendicular to axis C—C. The posts 24 are mounted to the bottom of the flat bed trailer 26 by welding or other methods.

The plurality of apertures 32 normally are used as an interface for the prior types of winch bars used for tightening the webbing 28. As shown in FIG. 2, the winding tool 10 of the present invention is used by inserting the hook 18 into the aperture 34, through the winch bar interface 30 and securing the end of the hook 18 through one of the plurality of apertures 32. Thus, in use, the axis A—A of the steel rod 11 will be generally aligned with the axis C—C of rotating cylinder 22. During rotation, the axis B—B of steel rod 11 will be offset from axis C—C and will thus rotate concentrically around that axis.

In use, the operator will insert the hook 18 of the winding bar 10 into the winch 20 as just described. The operator will then place his/her hands on the two sleeves 14 and 15. The operator will then provide a rotary force to turn the winding tool 10. Consequently, the rotating cylinder 22 will rotate around axis C—C and the webbing 28 will be rewound on the cylinder 22 after a few continuous turns of the winding tool 10. Thus, a quick and safe method for rewinding the webbing 28 is provided by the present invention.

Those of ordinary skill in the art will recognize that the embodiments just described merely illustrate the principles of the present invention. Many modifications may be made thereto without departing from the spirit and scope of the invention as set forth in the following claims.

What is claimed is:

1. A combination winch and winding tool for winding the winch, comprising:
    a) the winch which comprises an annular winch bar interface comprising an annular wall of a thickness, an axis, a first aperture in a plane perpendicular to the axis and a plurality of second apertures in the annular wall wherein the second apertures pass through the thickness of the annular wall;
    b) a bar comprising a plurality of elongated sections and an axis adapted to be aligned in use with the axis of the winch bar interface;
    c) a means, on one end of the bar, for engaging the winch bar interface through the first aperture and then only one of the plurality of second apertures in the annular wall; and
    d) means rotatingly mounted on the bar to facilitate rotation of the bar during use.

2. The combination of claim 1 wherein the plurality of elongated sections of the bar each comprise an axis wherein the axes of the respective elongated sections are aligned parallel and perpendicular to each other and less than all of the plurality of the elongated sections have axes aligned parallel to the axis of the bar.

3. The combination of claim 1 wherein the means for engaging the annular winch bar interface further comprises a bend in the bar at an angle.

4. The combination of claim 3 wherein the angle is ninety degrees.

5. The combination of claim 1 wherein the means for facilitating rotation of the bar during use are a plurality of elongated annular sleeves mounted on the elongated sections of the winding tool parallel to the axis of the bar.

6. The combination of claim 2 wherein the means for facilitating rotation of the bar during use are a plurality of elongated annular sleeves mounted on the elongated sections of the bar.

7. The combination of claim 5 wherein the means for engaging the annular winch bar interface further comprises a bend in the bar at an angle.

8. The combination of claim 7 wherein the angle is ninety degrees.

9. The combination of claim 6 wherein the means for engaging the annular winch bar interface further comprises a bend in the bar at an angle.

10. The combination of claim 9 wherein the angle is ninety degrees.

* * * * *